UNITED STATES PATENT OFFICE.

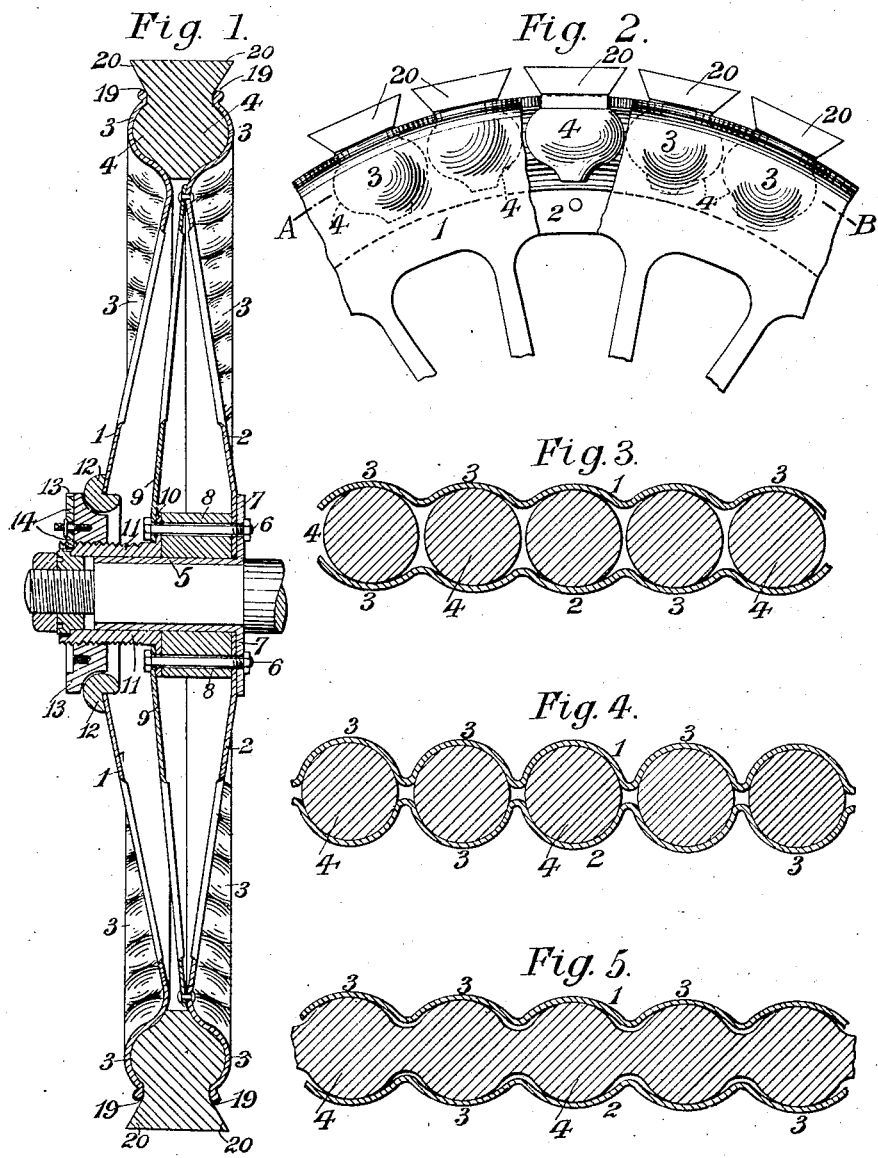

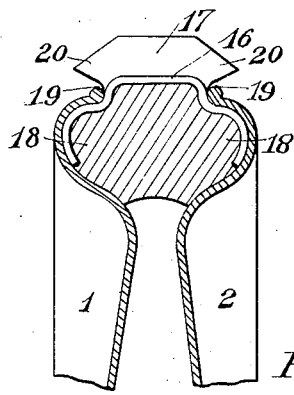
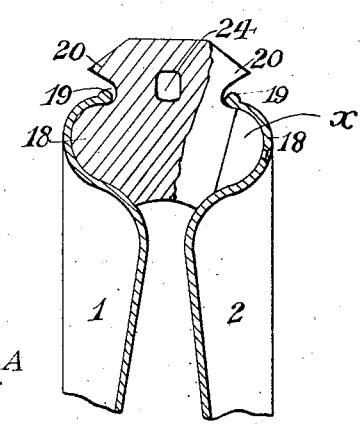
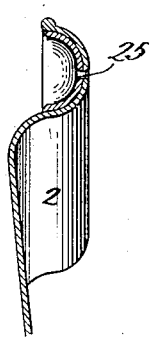
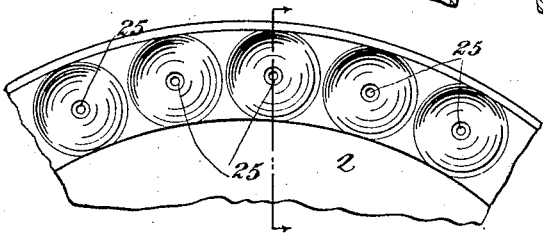
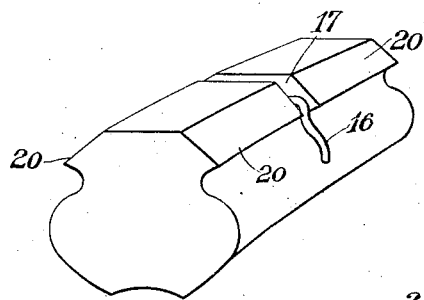
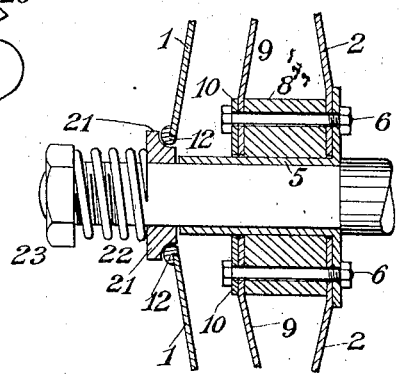

ROBERT THOMAS SMITH, JR., OF LONGFORD BRIDGE, WARRINGTON, ENGLAND, ASSIGNOR OF ONE-HALF TO LYNTON WHEEL & TYRE SYNDICATE, LIMITED, OF LONGFORD BRIDGE, WARRINGTON, ENGLAND.

VEHICLE-WHEEL.

1,032,957.   Specification of Letters Patent.   Patented July 16, 1912.

Application filed January 29, 1910. Serial No. 540,827.

*To all whom it may concern:*

Be it known that I, ROBERT THOMAS SMITH, Jr., a subject of the King of Great Britain and Ireland, of Longford Bridge, Warrington, in the county of Lancaster, England, have invented new and useful Improvements in Vehicle-Wheels, of which the following is a specification.

This invention relates to vehicle wheels in which a resilient tire is (or resilient blocks constituting a tire are) held in circumferential recesses, or channels, formed at the peripheries of two disks, or the equivalents, constituting the body of the wheel and mounted on the axle in such a way that one of the said disks is fixed as regards lateral movement and the other can have such movement, upon a bearing near its center, that, when the tire, or tire blocks, carried in the said recesses, or channels, is, or are, compressed by contact with the road, and the said tire, or tire blocks, consequently spread out laterally, the lower part of the movable disk is forced away from the fixed disk and the upper part of the said movable disk is consequently forced toward the fixed disk, so as to compress the tire, or tire blocks, at and toward the upper part of the disks, and spread it, or them, out in a radial direction, and the object of this invention is to provide a simple and efficient wheel on this principle, in which the tire, or the blocks constituting the tire, is, or are, held very securely in position, and so that it, or they, can be readily removed and replaced, and it is, or they are, so formed and arranged that there is no danger of the peripheries of the disks, or the equivalents, coming into contact with the road when the tire is, or blocks are, compressed.

The accompanying drawings represent the improvements in accordance with this invention.

Figure 1 is a vertical transverse section of the wheel. Fig. 2 is a side elevation of part of the wheel partly broken away. Fig. 3 is a circumferential section on the line A, B, Fig. 2. Figs. 4 and 5 are similar sections of modifications. Fig. 3ᴬ is a broken side elevation showing the inner face of a modified form of disk. Fig. 3ᴮ is a cross section on the line y—z, Fig. 3ᴬ. Figs. 6 and 7 are vertical transverse sections (respectively through the middle of the block and through the part nearer the end) of part of the wheel showing a modification of the form of tire, or tire blocks. Fig. 8 is a perspective view of one of the blocks and fastening device of this modification. Fig. 9 shows a modification of the mode of securing the movable disk in place.

Referring first to Figs. 1, 2 and 3; the wheel is made of two disks 1, 2, shaped to form channels with recesses, or cups, 3 near their peripheries to hold similarly shaped protuberances 4 on the blocks constituting the tire. The disk 2 is fixed to the sleeve 5 by passing bolts 6 through the flange 7 of the sleeve 5 through the said disk 2 through a filling piece 8 through a flange 10 on an externally screwed collar piece 11, which fits on the sleeve 5, and through a strut disk 9. This strut disk 9 is for the purpose of giving rigidity to the disk 2 and is riveted to it toward the periphery as shown. The opening in the middle of the disk 1 is made larger than that in the disk 2, and is provided with a rounded ring-piece 12, which bears against a curved seating on a ring piece 12 screwed on the collar-piece 11, these bearing parts being such as to allow of some little play between them to permit of movement of the disk 1, as hereinbefore explained. The ring piece 13 is secured in place by any suitable means, for example by a locking piece 14, secured to the ring piece 13 by a screw as shown, or otherwise, and engaging in recesses in the rim of the ring piece 13 and in the end of the sleeve 11 so as to secure the ring piece 13 in place when the disk 1 has been forced toward the disk 2 by the said piece 13, so that the blocks constituting the tire will be held firmly between the said disks. By the rounded, or partly spherical, protuberances 4 of the tire blocks being held in the correspondingly shaped recesses, or cups, 3, near the peripheries of the disks 1 and 2, each tire block is, by this very simple and secure means, held securely both from creeping around the wheel and from becoming separated from the wheel. Fig. 4 shows the recesses, or cups, 3 made deeper, and Fig. 5 shows a complete tire molded with similar partly spherical protuberances 4 and similarly held in the recesses, or cups, 3 against creeping and against becoming separated from the wheel. Instead of the recesses or cups 3 being made in the disks themselves they may be made in annular strips attached to the rims of the disks for example by countersunk rivets as at 25. Part of such a strip is shown in Fig. 3ᴬ.

Figs. 6, 7 and 8 show a modification wherein, instead of the recesses, or cups, 3, the blocks are received in plain channels extending around the disks 1 and 2, creeping being prevented by any suitable means, such as projections x riveted to the disks, or one of them, and coming between each two adjacent blocks, and the blocks are prevented from becoming accidentally detached from the wheel by means of wire retainers 16, each block being formed with a transverse channel 17 extending from the treads of the blocks to some distance inward and receiving a wire retainer 16, whose ends are turned downward and outward so that they are received in, and retained by, the turned-in outer parts of the channels in the disks 1 and 2, as seen clearly in Fig. 6. These blocks are made with protuberances 18 at each side adapted to fit into, and be held by, the channels in the disks 1 and 2.

The tire, or the blocks constituting the tire, extend a sufficient distance beyond the peripheries of the disks 1 and 2 and have circumferential grooves, as shown at 19 in Figs. 1 and 6, which grooves receive the turned-in, and preferably beaded, edges of the disks 1 and 2, the material of the tire, or blocks, extending out sidewise, as at 20, at a short distance from the rims of the disks 1 and 2, so that these extensions 20, if the wheel be under heavy load, will bear against the edges of the disks 1 and 2 and prevent their coming into contact with the road. If desired to increase the resiliency of the rubber, the blocks may be molded with an opening through them, as shown at 24 in Fig. 7.

Fig. 9 represents a modification of the means whereby the movable disk 1 is held in place. Around the opening in the center of the disk 1 is the rounded ring piece 12 and a ring-retaining piece 21 with a correspondingly curved recess in it is placed upon the axle so that the rounded ring piece 12 is received in the curved recess in the ring retaining piece 21. There is also placed on the axle a spring 22 which bears on the side of the said piece 21 opposite the side on which the disk 1 bears, the said spring 22 being secured in place by a nut 23 screwed on the end of the axle. The spring 22 exerts sufficient force to keep the disk 1 and tire, or blocks constituting the tire, in place, while giving a very satisfactory capacity for yielding to allow of sufficient movement of the disk 1 under the action of the tire, or tire-blocks, in the manner aforesaid, while the wheel is traveling under load. The spring 22 is merely illustration of any suitable spring device placed upon the axle in the same position. In this figure the strut disk 9 is inside the flange 10, instead of outside it, as in Fig. 1, but in either case, if it be used, it may be outside, or inside.

I claim as my invention:—

1. A vehicle wheel having two disks, one carried by a sleeve on the axle, and the other capable of movement when the tire is compressed under load, the said disks having around them, near their peripheries, partly spherical tire receiving recesses, and a resilient tire formed with partly spherical protuberances to engage the said recesses in the disks, substantially as hereinbefore described.

2. A vehicle wheel having two disks, one carried by a sleeve on the axle, and the other capable of movement when the tire is compressed under load, the said disks having around them, near their peripheries, partly spherical tire receiving recesses, and a resilient tire formed with partly spherical protuberances to engage the said recesses in the disks, in combination with means to prevent the tire from creeping around the wheel, substantially as hereinbefore described.

3. A vehicle wheel having two disks, one carried by a sleeve on the axle, and the other capable of movement when the tire is compressed under load, the said disks having around them, near their peripheries, partly spherical tire receiving recesses, and a resilient tire formed with partly spherical protuberances to engage the said recesses in the disk, said tire extending beyond and overlying the peripheries of said disks to prevent the same from coming in contact with the ground under heavy stress, substantially as hereinbefore described.

4. A vehicle wheel having two disks, one rigid with the axle and the other having an inner bearing ring, a retaining piece against which said ring bears, said piece having limited freedom of longitudinal displacement on said axle, and a spring pressing said retaining piece, in combination with a tire gripped between the outer edges of said disks, substantially as hereinbefore described.

In testimony whereof I have signed my name to this specification in the presence of two subscribing witnesses.

ROBERT THOMAS SMITH, Junior.

Witnesses:
MICHAEL AUGUSTUS TIGHE,
CHARLES MARSH.